United States Patent
Fujita et al.

(10) Patent No.: US 7,556,703 B2
(45) Date of Patent: Jul. 7, 2009

(54) METHOD OF BONDING CERAMICS STRUCTURES

(75) Inventors: Jun Fujita, Nagoya (JP); Naoshi Masukawa, Aichi (JP)

(73) Assignee: NGK Insulators, Ltd., Nagoya (JP)

( * ) Notice: Subject to any disclaimer, the term of this patent is extended or adjusted under 35 U.S.C. 154(b) by 421 days.

(21) Appl. No.: 10/542,848

(22) PCT Filed: Mar. 25, 2004

(86) PCT No.: PCT/JP2004/004164

§ 371 (c)(1),
(2), (4) Date: Apr. 24, 2006

(87) PCT Pub. No.: WO2004/085127

PCT Pub. Date: Oct. 7, 2004

(65) Prior Publication Data

US 2006/0225833 A1 Oct. 12, 2006

(30) Foreign Application Priority Data

Mar. 25, 2003 (JP) ............................ 2003-083432

(51) Int. Cl.
- *B29C 65/00* (2006.01)
- *B32B 37/00* (2006.01)
- *C03B 29/00* (2006.01)
- *C04B 33/34* (2006.01)
- *C04B 37/00* (2006.01)
- *B29C 65/48* (2006.01)
- *B32B 3/12* (2006.01)

(52) U.S. Cl. ................. 156/89.22; 156/84; 156/85; 156/89.11; 156/295; 428/116; 428/73

(58) Field of Classification Search .............. 156/60, 156/84, 85, 94, 153, 154, 250, 267, 295, 156/89.11, 89.12, 89.22
See application file for complete search history.

(56) References Cited

U.S. PATENT DOCUMENTS

| 5,759,669 A  * | 6/1998 | Casey et al. ................. 428/139 |
| 6,174,406 B1 * | 1/2001 | Gaynes et al. ............... 156/295 |
| 6,263,939 B1 * | 7/2001 | Miyamoto et al. ........... 156/539 |
| 7,138,002 B2 * | 11/2006 | Hamanaka et al. ............ 55/523 |

FOREIGN PATENT DOCUMENTS

JP          A 11-291229          10/1999

(Continued)

*Primary Examiner*—Jeff H Aftergut
*Assistant Examiner*—Brian R Slawski
(74) *Attorney, Agent, or Firm*—Oliff & Berridge, PLC

(57) ABSTRACT

A method of bonding at least a first ceramics structure (101) to a second ceramics structure (102), which includes the steps of applying a pressure to the first ceramics structure (101) and the second ceramics structure (102) in such a direction that these structures move close to each other with a bonding material layer (110) interposed between the first ceramics structure (101) and the second ceramics structure (102) (FIG. A), removing a bonding material (111a) extruded from the bonding material layer (110) to an end face of a stacked body including the first ceramics structure (101) and the second ceramics structure (102) by the application of the pressure thereto (FIG. B), drying a bonding material (111b) near the end face of the stacked body (120) after the extruded bonding material (111a) is removed (FIG. C), and drying the entire part of the stacked body (120).

1 Claim, 3 Drawing Sheets

PRESSURIZATION OF STACKED BODY

REMOVAL OF BONDING MATERIAL

FOREIGN PATENT DOCUMENTS

| | | |
|---|---|---|
| JP | A 2000-018301 | 1/2000 |
| JP | A 2000-007455 | 11/2000 |
| WO | WO-03/011427 A1 * | 2/2003 |
| WO | WO 03/031371 A1 | 4/2003 |

* cited by examiner

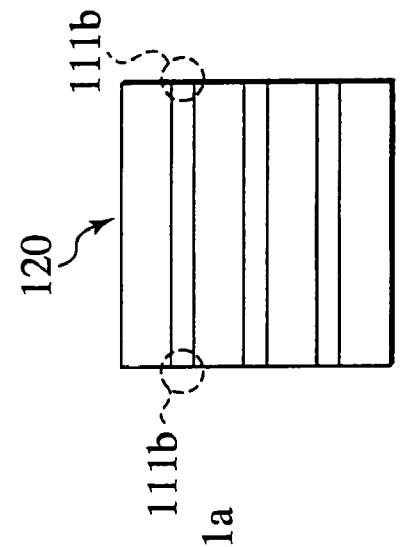
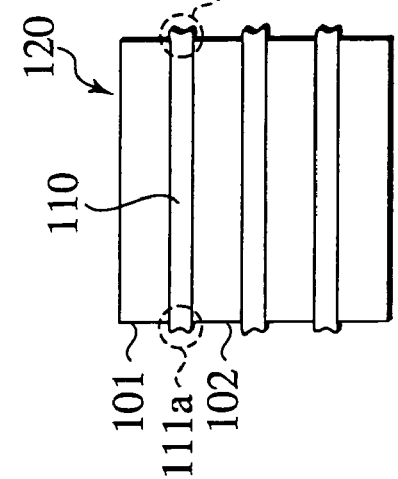
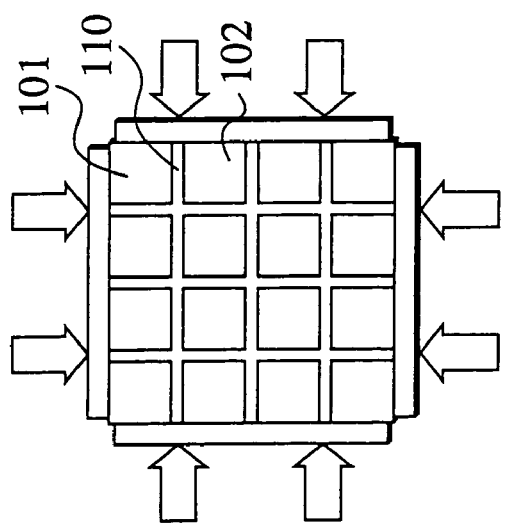

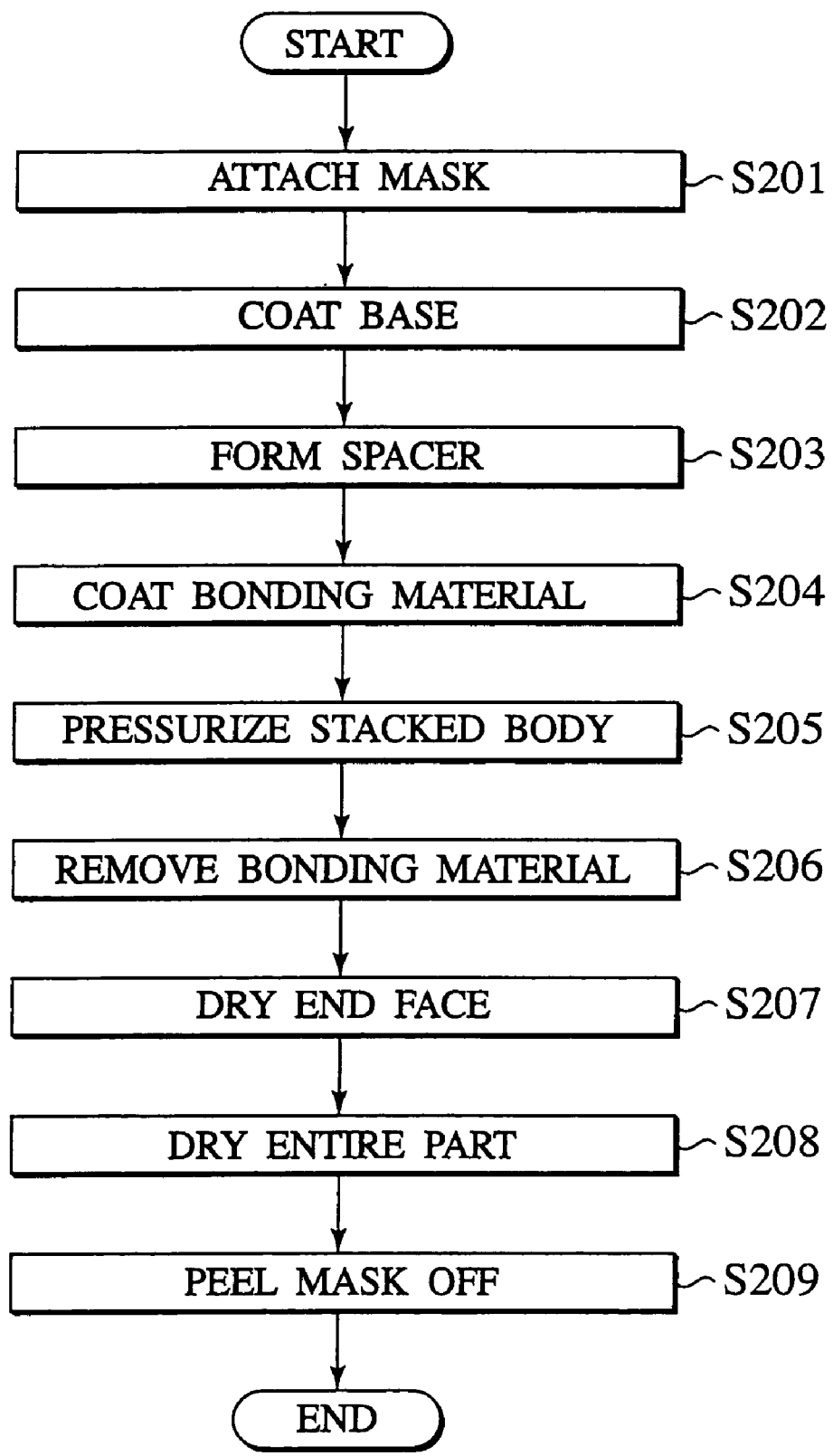

METHOD OF BONDING CERAMICS STRUCTURES

TECHNICAL FIELD

The present invention relates to a method of bonding ceramics structures, and more specifically, to a method of bonding ceramic structures used for a filter for collecting particulates in exhaust gas from an internal-combustion engine, a boiler, and the like, and those used for a catalyst carrier, and the like.

BACKGROUND ART

Conventionally, there has been disclosed a method of mutually bonding a plurality of ceramics structures by coating a bonding material on a bonded surface of a ceramics structure and pressing another ceramics structure against a side face coated with the bonding material.

Document 1: Japanese Unexamined Patent Publication No. 2000-7455

However, if the amount of the coated bonding material is small, a gap which is generated needs to be bridged in a later process, and productivity therefore goes down. And, if the amount of the bonding material is more than adequate to bridge the gap, the bonding material would excessively be squeezed out to an end face of a stacked body. Then, this excessively protruding bonding material leads to occurrence of shrinkage or cracks on a surface and inside of a bonding material layer, and causes a problem of a decrease in a bonding force mutually between the ceramics structures.

The present invention has been made in light of the above-described problem, and provides a method of bonding ceramic structures capable of preventing occurrence of shrinkage or cracks on a surface and inside of a bonding material layer between ceramics structures used for a filter for collecting particulates in exhaust gas from an internal-combustion engine, a boiler, and the like, and those used for a catalyst carrier, and the like.

SUMMARY OF THE INVENTION

A first characteristic of the present invention is a method of bonding at least a first ceramics structure to a second ceramics structure, which includes the steps of (1) applying a pressure to the first ceramics structure and the second ceramics structure in such a direction that these structures move close to each other with a bonding material layer interposed between the first ceramics structure and the second ceramics structure, (2) removing a bonding material extruded from the bonding material layer to an end face of a stacked body including the first ceramics structure and the second ceramics structure by the application of the pressure thereto, (3) drying a bonding material near the end face of the stacked body after the extruded bonding material is removed, and (4) drying the entire part of the stacked body.

According to the first characteristic, it is possible to prevent occurrence of shrinkage or cracks on the surface of the bonding material layer by removing the bonding material extruded by the pressurization, drying the bonding material near the end face of the stacked body remaining without being removed, and then drying the entire part of the stacked body.

BRIEF DESCRIPTION OF THE DRAWINGS

FIGS. 1A to 1C show a process flow of a bonding method according to an embodiment of the present invention, in which FIG. 1A describes pressurization of a stacked body, FIG. 1B describes removal of a bonding material, and FIG. 1C describes drying of an end face. FIG. 1B and FIG. 1C are side views of the stacked body shown in FIG. 1A.

FIG. 2A shows a state before removing the bonding material, and FIG. 2B shows a state after removing the bonding material.

FIG. 3 is a chart showing a process flow in the case of adding a mask attaching process and the like to this embodiment.

BEST MODES FOR CARRYING OUT THE INVENTION

Figure 2A:
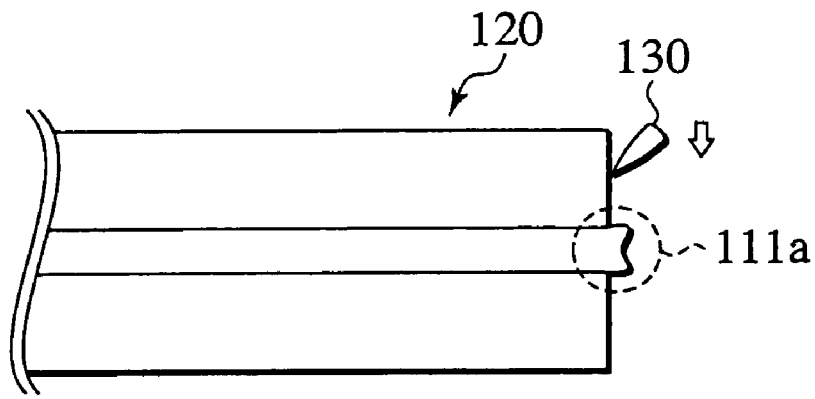
FIGS. 2A to 2C are enlarged views of the end face for describing the removal of the bonding material and drying of the end face, according to this embodiment.

Embodiments of the present invention will be described below with reference to the accompanying drawings. It is to be noted, however, that the present invention is not limited to these embodiments.

As shown in FIGS. 1A to 1C, this embodiment is a method of bonding at least a first ceramics structure 101 to a second ceramics structure 102, which includes the steps: firstly applying a pressure in such a direction that the first ceramics structure 101 and the second ceramics structure 102 move close to each other with a bonding material layer 110 interposed between the first ceramics structure 101 and the second ceramics structure 102 (FIG. 1A); removing a bonding material 111a extruded from the bonding material layer 110 to an end face of a stacked body 120 including the first ceramics structure 101 and the second ceramics structure 102 by the application of the pressure thereto (FIG. 1B); drying a bonding material 111b near the end face of the stacked body 120 after the extruded bonding material 111a is removed (FIG. 1C); and drying the entire part of the stacked body 120.

The direction that the first ceramics structure 101 and the second ceramics structure 102 move close to each other is a direction indicated by an arrow in FIG. 1A.

The ceramics structures include a honeycomb structure used for a filter for collecting particulates in exhaust gas from an engine, a boiler, and the like, and those used for a catalyst carrier, and the like.

The bonding material for instance includes bonding materials made of silicon carbide powder, aluminosilicate fibers, colloidal silica, water, and the like. These bonding materials are coated by use of coating means such as a mohno pump, a spatula or a brush.

Means for applying the pressure to a plurality of ceramics structures including the first ceramics structure 101 and the second ceramics structure 102, in the direction that these ceramics structures move close to one another, include a pressurizing cylinder, hydrostatic pressurization, and the like.

Means for removing the bonding material 111a extruded to the end face of the stacked body 120 includes scraping with a spatula and the like. In order to remove the bonding material cleanly, it is preferable that a member of the removing means contacting the end face of the stacked body 120 is a material such as rubber and plastics having high adhesion to the end face of the stacked body.

Figure 2B:
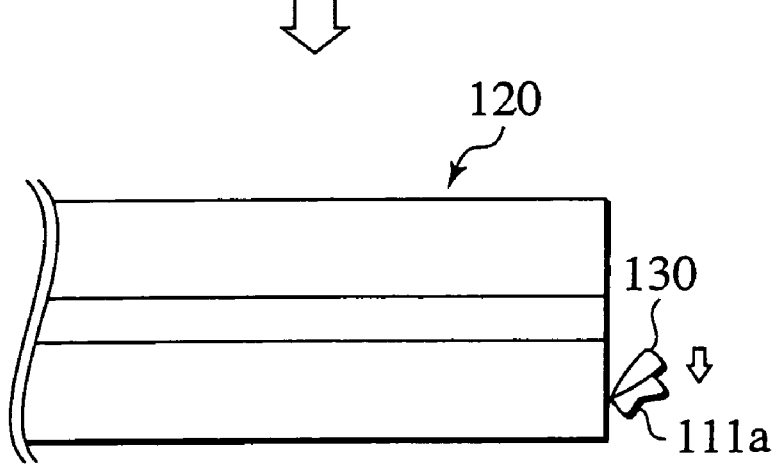
Figure 2C:
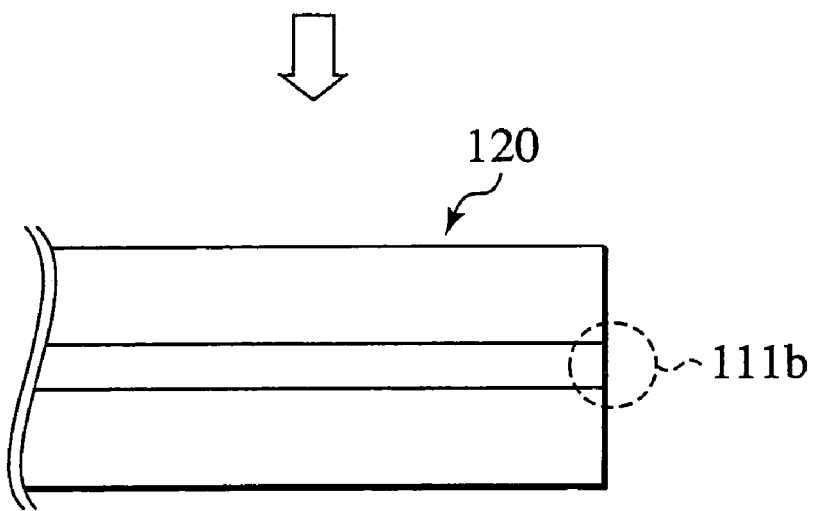

As shown in FIGS. 2A to 2C, removing means 130 is moved in a direction of an arrow to remove the bonding material 111a extruded to the end face of the stacked body (FIG. 2A), and after removing the bonding material 111a by use of the removing means 130 (FIG. 2B), the bonding material 111b near the end face is dried (FIG. 2C).

If the drying of the entire part of the stacked body is started without removing the bonding material extruded to the end face of the stacked body, when grinding the bonding material dried and hardened in the extruded state, cracks and the like may occur on a surface of the bonding material which remains in the vicinity of the end face without being ground off.

Meanwhile, it is preferable to remove the bonding material extruded to the end face of the stacked body after the bonding material is extruded to the end face of the stacked body but before shrinkage or cracks occur in the bonding material layer between the first ceramics structure and the second ceramics structure.

If there is a long time period from the time when the bonding material is extruded to the end face of the stacked body by the pressurization to the time when the removal of this extruded bonding material is started, shrinkage or cracks may occur in the bonding material located further inside the bonding material to be removed by the removing means due to air drying. For this reason, when the extruded bonding material is removed, the shrinkage or cracks which have occurred inside the bonding material before the removal may be exposed occasionally.

Moreover, it is preferable to dry a surface of the bonding material after removing the extruded bonding material but before shrinkage or cracks occur on the surface of the bonding material, which emerges on the end face of the stacked body as a result of the removal of the bonding material.

If there is a long time period from the time when the extruded bonding material is removed to the time when the drying of the remaining bonding material is started, shrinkage or cracks may occur on the surface of the bonding material due to air drying occasionally.

As described above, it is possible to prevent occurrence of shrinkage or cracks in the bonding material on the end face by: applying the pressure to the first ceramics structure and the second ceramics structure in the direction that these structures move close to each other with the bonding material layer interposed between the first ceramics structure and the second ceramics structure; removing the bonding material extruded from the bonding material layer to the end face of the stacked body including the first ceramics structure and the second ceramics structure by the application of the pressure thereto; drying the bonding material near the end face of the stacked body after the extruded bonding material is removed; and then drying the entire part of the stacked body.

Here, as shown in FIG. 3, it is also possible to apply the steps of firstly attaching a masking material to both end faces of the ceramics structures (S201), coating a base on bonded surfaces of the ceramics structures (S202), forming a spacer on the bonded surfaces of the ceramics structures so as to form a constant interval between the ceramics structures (S203), then as described previously coating the bonding material to the bonded surfaces of the ceramics structures (S204), laminating the ceramics structures and mutually pressing the ceramics structures against each other (S205), removing the bonding material extruded to the end faces of the stacked body (S206), drying the end faces of the stacked body (S207), drying the entire part of the stacked body (S208), and peeling the masking material off (S209). By attaching the masking material to the end faces of the stacked body as described above, it is possible to prevent open portions of through holes of the ceramics structures formed in a longitudinal direction from being occluded by the bonding material extruded to the end faces of the stacked body.

EXAMPLES

The present invention will be described further in detail below based on examples. However, the scope of the present invention will not be limited by these examples.

A bonding material containing 39% by weight of silicon carbide powder, 32% by weight of aluminosilicate fibers, 19% by weight of colloidal silica, and 10% by weight of water was used in the following examples. Viscosity was equal to 35 Pascals second. Examples 1 to 9 and Comparative Examples 1 to 14 have been carried out in a room set to a temperature of 25° C. and a humidity of 65%.

Examples 1 to 5 and Comparative Examples 1 to 11

Winds having the following parameters were sprayed on the end face of the stacked body and then the stacked body was let stand for 5 minutes in the room. Then, existence of shrinkage on the end surface was checked.

TABLE 1

|  | Wind velocity [m/sec] | Temperature [° C.] |
| --- | --- | --- |
| Example 1 | 10 | 100 |
| Example 2 | 11 | 80 |
| Example 3 | 12 | 115 |
| Example 4 | 13 | 100 |
| Example 5 | 9 | 100 |
| Comparative Example 1 | 4 | 125 |
| Comparative Example 2 | 4 | 123 |
| Comparative Example 3 | 3 | 111 |
| Comparative Example 4 | 7 | 100 |
| Comparative Example 5 | 7 | 120 |
| Comparative Example 6 | 10 | 24 |
| Comparative Example 7 | 10 | 26 |
| Comparative Example 8 | 0 | 125 |
| Comparative Example 9 | 6 | 25 |
| Comparative Example 10 | 13 | 25 |
| Comparative Example 11 | 8 | 70 |

Although no shrinkage occurred in Examples 1 to 5, shrinkage occurred in all Comparative Examples 1 to 11.

Examples 6 to 9 and Comparative Examples 12 to 14

In Examples 6 to 9 and Comparative Examples 12 to 14, a wind having a wind velocity of 10 meters per second and a temperature of 100° C. was sprayed on the end surface of the stacked body for the following periods in seconds. Then, the stacked body was let stand for 5 minutes in the room set to the temperature of 25° C. and the humidity of 65%. Thereafter, existence of shrinkage on the end surface was checked.

TABLE 2

|  | Time [sec] |
| --- | --- |
| Example 6 | 40 |
| Example 7 | 50 |
| Example 8 | 60 |
| Example 9 | 120 |
| Comparative Example 12 | 10 |
| Comparative Example 13 | 20 |
| Comparative Example 14 | 30 |

Although no shrinkage occurred in Examples 6 to 9, shrinkage occurred in all Comparative Examples 12 to 14.

INDUSTRIAL APPLICABILITY

As described above, according to the present invention, it is possible to prevent occurrence of shrinkage or cracks on a bonding material layer by removing a bonding material extruded to an end face of a stacked body by pressurization, drying the bonding material existing in the vicinity of the end face of the stacked body, and then drying the entire part of the stacked body.

The invention claimed is:

1. A method of bonding ceramic structures for bonding at least a first ceramics structure to a second ceramics structure, comprising the steps of:

applying a pressure to the first ceramics structure and the second ceramics structure in such a direction that these structures move close to each other with a bonding material layer interposed between the first ceramics structure and the second ceramics structure;

removing a bonding material extruded from the bonding material layer to an end face of a stacked body including the first ceramics structure and the second ceramics structure by the application of the pressure thereto before any of shrinkage and cracks occur in the extruded bonding material;

drying a bonding material near the end face of the stacked body locally by spraying winds on the end face of the stacked body and after removing the extruded bonding material; and drying the entire part of the stacked body after drying the bonding material near the end face of the stacked body.

* * * * *